United States Patent [19]

Kashiwa et al.

[11] 4,438,243

[45] Mar. 20, 1984

[54] PROCESS FOR PRODUCING RANDOM ETHYLENE TERPOLYMER

[75] Inventors: Norio Kashiwa; Yoshinori Morita; Michiharu Suga, all of Iwakuni, Japan

[73] Assignee: Mitsui Petrochemical Industries, Ltd., Tokyo, Japan

[21] Appl. No.: 263,721

[22] Filed: May 14, 1981

Related U.S. Application Data

[63] Continuation of Ser. No. 85,584, Oct. 17, 1979, abandoned.

[30] Foreign Application Priority Data

Oct. 18, 1978 [JP] Japan ................. 53-127305

[51] Int. Cl.$^3$ .......................... C08F 2/06; C08F 10/02
[52] U.S. Cl. ........................ 526/125; 526/348.2; 526/348.4; 526/348.6
[58] Field of Search .................. 526/124, 125

[56] References Cited

U.S. PATENT DOCUMENTS 3,645,992 2/1972 Elston .................. 526/348.6
4,205,021 5/1980 Morita et al. .......... 526/125
4,363,904 12/1982 Fraser et al. .......... 526/348.2

Primary Examiner—Edward J. Smith
Attorney, Agent, or Firm—Sherman & Shalloway

[57] ABSTRACT

A process for producing a random terpolymer of ethylene and alpha-olefins having at least 3 carbon atoms in the presence of a catalyst composed of (1) a titanium catalyst component containing at least magnesium and titanium and (2) an organoaluminum catalyst component in a hydrocarbon solvent at a temperature above the melting point of the terpolymer formed, under such conditions that the resulting copolymer dissolves in the hydrocarbon solvent; characterized in that said terpolymer consists essentially of (A) more than 90 mole % to 99.5 mole % of ethylene,
(B) 0.2 mole % to 9.8 mole % of an alpha-olefin with 3 to 4 carbon atoms, and
(C) 0.2 mole % to 9.8 mole % of an alpha-olefin with 5 to 18 carbon atoms, the total of the proportions of the monomers (A), (B) and (C) being 100 mole %.

10 Claims, No Drawings

PROCESS FOR PRODUCING RANDOM ETHYLENE TERPOLYMER

This is a continuation of U.S. patent application Ser. No. 085,584, filed Oct. 17, 1979, now abandoned.

This invention relates to a process for producing a random ethylene terpolymer which has nonrubbery and plastic properties, and excellent tear strength, impact strength and transparency without a substantial deterioration in its favorable mechanical properties, and which is suitable for production of melt-shaped articles such as films or hollow containers.

High-pressure polyethylene has been considered to possess relatively good transparency and used in the production of melt-shaped articles such as films, sheets and hollow containers. Films of high-pressure polyethylene, however, have only limited applications because of their unsatisfactory tear strength and impact strength and their difficulty of attaining small thicknesses. Furthermore, films having superior transparency are difficult to obtain from high-pressure polyethylene by an inflation molding technique. It has been desired therefore to develop olefinic resins having improved transparency.

Generally, copolymers of ethylene with alpha-olefins having at least 3 carbon atoms which are produced by using Ziegler-type catalysts have much the same density as high-pressure polyethylene, and exhibit relatively good mechanical strength. When produced by using vanadium-containing Ziegler catalysts, these copolymers have relatively low melting points, and their thermal resistance is unsatisfactory. Titanium-containing Ziegler catalysts, on the other hand, lead to copolymers having poor transparency.

Copolymers having much the same transparency as high-pressure polyethylene could be produced in the presence of the titanium-containing Ziegler catalysts if the polymerization conditions or the catalysts are properly modified (as disclosed in Canadian Pat. No. 986,250 assigned to Mitsui Petrochemical Industries, Ltd., issued on Mar. 23, 1976; corresponding to British Pat. No. 1,355,245 published on Oct. 2, 1974). In practice, however, it has been impossible to provide ethylene copolymers having better transparency as well as higher tear resistance and impact resistance than high-pressure polyethylene films. Moreover, the Canadian Patent does not specifically disclose terpolymers of ethylene, alpha-olefins with 3 or 4 carbon atoms and alpha-olefins having 5 to 18 carbon atoms.

Random copolymers of ethylene or propylene having novel characteristic features which exhibit improved transparency while retaining their good mechanical properties have been suggested in the past (see, for example, German OLS Nos. 2,757,863 and 2,803,598).

The above-cited German OLS No. 2,757,863 discloses a random propylene copolymer having novel characteristic features consisting essentially of 40 to 90 mole% of propylene and 60 to 10 mole% of 1-butene, and the cited German OLS No. 2,803,598 discloses an ethylene copolymer having novel characteristic features consisting essentially of a major proportion of ethylene and a minor proportion of an alpha-olefin having 5 to 18 carbon atoms, which have unique structural chracteristics. These patent documents, however, do not at all refer to terpolymers derived from ethylene, and alpha-olefin having 3 or 4 carbon atoms and an alpha-olefin having 5 to 18 carbon atoms.

U.S. Pat. No. 3,222,332 discloses the preparation of copolymers of ethylene with propylene and/or butene-1, in which an alpha-olefin with at least 5 carbon atoms is used as comonomer, preferably an alpha olefin with at least 8 and at most 16 carbon atoms.

The process disclosed in the U.S. Patent leads to products with special properties, in particular to rubber-like products which are completely or almost completely amorphous and which possess hysterisis properties after vulcanization. In the U.S. Patent, an ethylene content of 50 to 90 mole% in the copolymer is recommended, and only a titanium trihalide is disclosed as a titanium catalyst component of the catalyst used in the copolymerization. No description is given in the Patent as to a titanium catalyst component containing at least magnesium and titanium. In addition, the resulting copolymers are rubber-like products which exhibit their useful properties only after vulcanization.

We made investigations in order to provide ethylene copolymers having improved properties over the ethylene copolymers disclosed in the above-cited German OLS No. 2,803,598, particularly having better transparency without involving a deterioration in mechanical properties.

These investigations have led to the discovery that the desired improvements can be achieved by using (B) 0.2 to 9.8 mole% of an alpha-olefin with 3 or 4 carbon atoms and (C) 0.2 to 9.8 mole% of an alpha-olefin with 5 to 18 carbon atoms as comonomers to be copolymerized with (A) a major proportion (more than 90 mole% to 99.5 mole%) of ethylene, the total of the proportions of the monomers (A), (B) and (C) being 100 mole%. It has also been found that the resulting terpolymer can be melt-shaped, without the need for vulcanization, into articles having superior properties, for example packaging films having superior transparency, tear strength, impact strength and heat-sealing property; or can be melt-extruded on other plastic films to form superior laminate films; or exhibit excellent properties as blending resins to be blended with other thermoplastic synthetic resins.

It is an object of this invention therefore to provide a process for producing a random ethylene terpolymer having improved properties.

The above and other objects and advantages of this invention will become more apparent from the following description.

The present invention provides a process for producing a random ethylene terpolymer of ethylene with an alpha-olefin having at least 3 carbon atoms in the presence of a catalyst composed of a titanium catalyst component containing at least magnesium and titanium and an organoaluminum catalyst component in a hydrocarbon solvent at a temperature above the melting point of the terpolymer formed, under such conditions that the resulting terpolymer dissolves in the hydrocarbon solvent; characterized in that said terpolymer consists essentially of (A) more than 90 mole% to 99.5 mole% of ethylene,
(B) 0.2 mole% to 9.8 mole% of an alpha-olefin with 3 to 4 carbon atoms, and
(C) 0.2 mole% to 9.8 mole% of an alpha-olefin with 5 to 18 carbon atoms,
   the total of the proportions of the monomers (A), (B) and (C) being 100 mole%.

The catalyst used in this invention composed of the aforesaid titanium catalyst component containing at least magnesium and titanium and the aforesaid organoaluminum catalyst component is known.

In the titanium catalyst component, the titanium compound is present in the form supported on a magnesium compound in many cases. Or it is present in the form of a complex formed of a soluble magnesium compound complex and a titanium compound. In the aforesaid supported catalyst component, a magnesium halide is present either alone or as a complex with another metal compound. For example, when the magnesium halides is used as a starting material, the magnesium halide supports the titanium compound while it is rendered non-crystalline by mechanical pulverization or by the aid of an electron donor. When other magnesium compounds are used as the starting material, a halogenating agent (which may be a titanium compound) is caused to act on the magnesium compound in the step of catalyst preparation to convert it partly or wholly into the corresponding magnesium halide. By supporting the titanium compound on the resulting magnesium halide, a catalyst component having high activity can be obtained.

Preferably, the catalyst used in this invention is composed of a solid, magnesium-containing titanium catalyst component and an organoaluminum compound. It is preferred that such a catalyst should have the ability to form a terpolymer in an amount of at least 50 g per mg of Ti in the catalyst. Especially preferred catalysts are those in which the solid titanium catalyst component is obtained by supporting titanium on a compound containing a magnesium halide, especially magnesium chloride and has a Cl/Ti weight ratio of from 3 to 200, preferably from 5 to 150, an Mg/Ti mole ratio of from 3 to 90, and a surface area of at least 20 m²/g, preferably at least 40 m²/g, more preferably at least 150 m²/g.

The solid titanium catalyst component preferably contains 0.5 to 10 parts by weight of titanium, 15 to 30 parts by weight of magnesium, and 50 to 70 parts by weight of halogen, the total proportion of these components being 100 parts by weight. It may also contain more than 0.01, preferably about 0.1 to 50 parts by weight of an electron donor and/or other elements.

Examples of the electron donor that may be included in the solid titanium catalyst component include alcohols having 1 to 18 carbon atoms such as methanol, ethanol, propanol, pentanol, hexanol, octanol, dodecanol, octadecyl alcohol, benzyl alcohol, phenylethyl alcohol, cumyl alcohol and isopropyl benzyl alcohol; organic acid esters having 2 to 18 carbon atoms such as methyl formate, ethyl acetate, vinyl acetate, propyl acetate, octyl acetate, cyclohexyl acetate, ethyl propionate, methyl butyrate, ethyl valerate, methyl chloroacetate, methyl methacrylate, ethyl cyclohexanecarboxylate, methyl benzoate, ethyl benzoate, octyl benzoate, cyclohexyl benzoate, phenyl benzoate, benzyl benzoate, ethyl toluate, amyl toluate, ethyl ethylbenzoate, ethyl anisate, ethyl ethoxybenzoate, gammabutyrolactone and coumarin; carboxylic acids having 2 to 18 carbon atoms; phenols having 6 to 15 carbon atoms; aldehydes having 2 to 15 carbon atoms; ketones having 3 to 15 carbon atoms; ethers having 2 to 20 carbon atoms; acid amides; amines; and nitriles.

Some suitable titanium catalyst components are disclosed, for example, in Japanese Patent Publication No. 26383/72 (U.S. Pat. No. 3,305,986), Japanese Patent Publication No. 41676/72 (British Pat. No. 1,286,867), Japanese Patent Publication No. 32270/75 (U.S. Pat. No. 4,071,674, and British Pat. No. 1,433,537), Japanese Laid-Open Patent Publication No. 88983/74 (U.S. Pat. No. 4,071,672), and Japanese Laid-Open Patent Publication No. 95382/75) (British Pat. No. 1,485,520). These patents do not give a specific example of terpolymerizing ethylene, an alpha-olefin with 3 or 4 carbon atoms and an alpha-olefin with 5 to 18 carbon atoms.

A solid titanium catalyst component which is disclosed in the above-cited British Pat. No. 1,433,537 and has the surface area specified hereinabove can be synthesized, for example, by adding about 3 to about 7 moles of a lower alcohol such as ethanol to 1 mole of magnesium chloride, reacting the adduct with an amount of an organoaluminum compound which is sufficient to react with the alcohol, and then reacting the resulting product with titanium tetrachloride or its solution in an inert hydrocarbon.

Preferred organoaluminum compounds include, for example, compounds of formula $M^1AlR_4^1$ wherein $R^1$ is a hydrocarbon group, $M^1$ is lithium, sodium or potassium, compounds of formula $R^1_{3-m}AlX_m$ wherein $R^1$ is the same as defined above, X is a halogen atom, and m is zero or a positive number of not greater than 3, compounds of formula $R^1_{3-n}Al(OR^2)_n$ wherein $R^1$ is the same as defined above, $R^2$ is a hydrocarbon group, which is identical to, or different from, $R^1$, and n is a positive number greater than 0 but not greater than 3, and compounds of formula $R^1Al(OR^2)X$ wherein $R^1$, $R^2$ and X are the same as defined above.

If there are two or more groups $R^1$, $R^2$ and X in each of the above gormula, they may be the same or different. Preferred hydrocarbon groups represented by $R^1$ or $R^2$ contain 1 to 15 carbon atoms. X is preferably chlorine or bromine. Examples of the hydrocarbon groups $R^1$ and $R^2$ are alkyl and aryl groups. Of the organoaluminum compouns exemplified above, compounds of the formula $R^1_{3-m}AlX$ are especially preferred.

The solid titanium catalyst component disclosed in the British Pat. No. 1,485,520 can be prepared by reacting the solid titanium catalyst component obtained by the method of the British Pat. No. 1,433,537 with small amounts of titanium terrachloride and an organoaluminum compound. The organoaluminum compounds exemplified above can also be used in this process.

The solid titanium catalyst components obtained by these two methods contain titanium, magnesium, halogen and aluminum, and have a surface area of at least 70 m²/g, preferably more than 150 m²/g but not exceeding 500 m²/g.

Examples of suitable organoaluminum catalyst components are compounds having an Al—C bond in the molecule, such as (i) organoaluminum compounds of the following formula

$$R^1_mAl(OR^2)_nH_pX_q$$

wherein $R^1$ and $R^2$ are indentical or different, and represent a hydrocarbon radical containing usually 1 to 15 carbon atoms, preferably 1 to 4 carbon atoms, X represents a halogen atom, m is a number defined by $0<n\leq3$, n is a number defined by $0\leq n<3$, p is a number defined by $0\leq p<3$, and q is a number defined by $0\leq q<3$ provided that $m+n+p+q=3$, and (ii) complex alkyl compounds of metals of Group I and aluminum having the general formula

$$M^1AlR^1_4$$

wherein $M^1$ represents Li, Na and K, and $R^1$ is as defined above.

Examples of the hydrocarbon groups $R^1$ and $R^2$ are alkyl, alkenyl and aryl groups.

Examples of the organoaluminum compound within the group (i) are those of the general formulae $R^1{}_mAl(OR^2)_{3-m}$ (wherein $R^1$ and $R^2$ are the same as defined above, and m is preferably a number defined by $1.5 \leq m \leq 3$), $R^1{}_mAlX_{3-m}$ (wherein $R^1$ is as defined above, X is halogen, and m is preferably a number defined by $0 < m < 3$), $R^1{}_mAlH_{3-m}$ (wherein $R^1$ is as defined above, and m is preferably $2 \leq m < 3$), and $R^1{}_mAl(OR^2)_nX_q$ (wherein $R^1$ and $R^2$ are as defined above, X is halogen, $0 < m < 3$, $0 \leq n < 3$, $0 \leq q < 3$, and $m + n + q = 3$).

Specific examples of the aluminum compounds which fall into the group (i) include trialkyl aluminums such as triethylaluminum and tributyl aluminum; trialkenyl aluminums such as triisoprenyl aluminum; partially alkoxylated alkyl aluminums, for example, dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; compounds having an average composition expressed by $R^1{}_{2.5}Al(OR^2)_{0.5}$; partially halogenated alkyl aluminums, for example, dialkyl aluminum halogenides such as diethyl aluminum chloride, dibutyl aluminum chloride and diethyl aluminum bromide; alkyl aluminum sesquihalogenides such as ethyl aluminum sesquichloride, butyl aluminum sesquichloride and ethyl aluminum sesquibromide; alkyl aluminums dihalides such as ethyl aluminum dichloride, propyl aluminum dichloride and butyl aluminum dibromide; partially hydrogenated alkyl aluminums, for example, dialkyl aluminum hydrides such as diethyl aluminum hydride and dibutyl aluminum hydride, alkyl aluminum dihydrides such as ethyl aluminum dihydride and propyl aluminum dihydride; and partially alcoholated and halogenated alkyl aluminums, for example, alkyl aluminum alkoxyhalides such as ethyl aluminum ethoxychloride, butyl aluminum butoxychloride and ethyl aluminum ethoxybromide.

Organoaluminum compounds in which two or more aluminum atoms are bonded through on oxygen or nitrogen atom may also be used as compounds anlogous to the compounds of group (i). Examples of such compounds are $(C_2H_5)_2AlOAl(C_2H_5)_2$, $(C_4H_9)_2AlOAl(C_4H_9)_2$, and

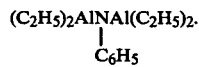

Examples of compounds of formula (ii) are $LiAl(C_2H_5)_4$ and $LiAl(C_7H_{15})_4$.

Among the above organoaluminum compounds, those represented by the general formula $R'{}_mAlX_{3-m}$ and having the average composition $1 \leq m \leq 2.7$, preferably $1.5 \geq m \geq 2.3$ are preferred because they lead to terpolymers having good transparency. Especially suitable organoaluminum compounds are alkyl aluminum sesquihalogenides and dialkyl aluminum halogenides, alkyl aluminum sesquichlorides and dialkyl aluminum chlorides being most preferred.

In the process of this invention, the terpolymerization reaction is carried out in the presence of the above-illustrated catalyst in a hydrocarbon solvent at a temperature above the melting point of the terpolymer formed, under such conditions that the solvent and the resulting terpolymer form a homogeneous phase.

The polymerization solvent is an inert hydrocarbon solvent or the monomers themselves may be used as the solvent. Examples of the inert solvent are aliphatic hydrocarbons such as n-pentane, n-hexane, n-heptane, isohexane, isooctane, n-decane and kerosene; alicyclic hydrocarbons such as cyclopentane, methylcyclopentane, cyclohexane and methylcyclohexane; and aromatic hydrocarbons such as benzene, toluene, xylene and ethylbenzene.

The copolymer should dissolve in the polymerization medium. The resulting solution may separate into a phase rich in the terpolymer, and a phase poor in the terpolymer. Preferably, however, the polymerization is carried out under such conditions that the resulting terpolymer and the polymerization solvent form a homogeneous phase. The conditions for forming the homogeneous phase vary depending upon the type of the solvent, the concentrations (pressure) of the monomers in the solvent and hydrogen, the polymerization temperature, the molecular weight (intrinsic viscosity) of the terpolymer. The concentration of the terpolymer should be adjusted according to the individual conditions so that it dissolves in the hydrocarbon solvent.

The concentration of the terpolymer varies also depending upon the polymerization conditions. Usually, it is preferably maintained at about 50 to 300 g per liter of solution. The polymerization temperature is above the melting point of the terpolymer, usually 125° to 240° C., preferably 130° to 220° C. The terpolymerization can be performed either batchwise or continuously. The continuous method is preferred for obtaining terpolymers having good transparency.

The amount of the titanium catalyst component used is for, for example, 0.0005 to 1 millimole, preferably 0.001 to 0.1 millimole, calculated as titanium atom. The amount of the organoaluminum catalyst component is for example 0.01 to 10 millimoles, preferably 0.05 to 1 millimoles, calculated as aluminum. Preferably, the Al/Ti mole ratio is adjusted to about 1 to 1000.

In the present invention, ethylene, an alpha-olefin having 3 or 4 carbon atoms and an alpha-olefin having 5 to 18 carbon atoms are terpolymerized under the aforesaid polymerization conditions so as to form a terpolymer consisting essentially of more than 90 mole% to 99.5 mole%, preferably 92 to 99 mole%, of ethylene, 0.2 to 9.8 mole%, preferably 0.3 to 7 mole%, of the alpha-olefin having 3 or 4 carbon atom, and 0.2 to 9.8 mole%, preferably 0.3 to 7 mole%, of the alpha-olefin having 5 to 18 carbon atoms.

The alpha-olefin with 3 or 4 carbon atoms to be terpolymerized with ethylene in this invention is propylene or butene-1. Examples of the alpha-olefin with 5 to 18 carbon atoms include 1-pentene, 1-hexene, 4-methyl-1-pentene, 3-methyl-1-pentene, 1-heptene, 1-octene, 1-decene, 1-dodecene, 1-tetradecene, 1-octadecene, and mixtures of these. Alpha-olefins having 6 to 12 carbon atoms are preferred, and 4-methyl-1-pentene is especially preferred.

Adjustment of the proportions of the monomers (A), (B) and (C) in the process of this invention to the ranges specified above can be performed by adjusting the proportions of the alpha-olefins fed. The proportions of the alpha-olefins may vary according to the types of the alpha-olefins, the polymerization temperature, the partial pressure of ethylene in the polymerization vessel, and other polymerization conditions. For example, the alpha-olefin having 3 or 4 carbon atom is fed in an amount of 0.003 to 2.0 moles, preferably about 0.005 to 1.0 mole, and the alpha-olefin having 5 to 18 carbon atoms is fed in an amount of from 0.005 to 10 moles, preferably from 0.01 to 3.0 moles, both per mole of ethylene.

The terpolymerization is carried out preferably under elevated pressures, for example under about 2 to about 100 kg/cm², preferably from about 10 about 50 kg/cm². Generally, hydrogen is used for control of molecular weight.

The ethylene copolymer of the aforesaid composition obtained by the process of this invention has a density of generally 0.900 to 0.945 g/cm³, preferably 0.910 to 0.940 g/cm³. The suitable molecular weight of the copolymer is 0.5 to 4.0 dl/g, especially 1.0 to 3.0 dl/g, expressed by intrinsic viscosity measured in decalin at 135° C.

The terpolymer obtained by this invention has superior transparency, tear strength and impact strength, and is suitable for use as a film. Since it also has very good heat sealing property, films prepared from this copolymer are suitable as packaging films. Films prepared from the terpolymer by a T-die method and an inflation method all have high transparency.

The terpolymer obtained by this invention can also be shaped into various articles by blow molding, injection molding, extrusion molding, etc. It can also be extrusion-coated on other films to form coated films. Or it can be blended with other polyolefins such as polyethylene, polypropylene, poly-1-butene, poly-4-methyl-1-pentene, an ethylene-propylene copolymer, an ethylene-1-butene copolymer and a propylene-1-butene copolymer. Moreover, it may be used after incorporating petroleum resins, waxes, stabilizers, antistatic agents, ultraviolet absorbers, natural or synthetic rubbers, lubricants, inorganic fillers, etc.

EXAMPLE 1

Preparation of a Ti catalyst component:

Under a nitrogen stream, 10 moles of anhydrous magnesium dichloride (commercially available) was suspended in 30 liters of dehydrated and purified hexane. With stirring, 60 moles of ethanol was added dropwise over 1 hour, and reacted at 30° C. for 1 hour. Then, 27 moles of diethyl aluminum chloride was added dropwise at room temperature, and the mixture was stirred for 1 hour. Subsequently, 30 moles of titanium tetrachloride was added. The mixture was heated to 80° C., and reacted for 3 hours with stirring. The resulting solid was separated by decantation, and repeatedly washed with purified hexane to form a hexane suspension of the solid. The concentration of titanium was determined by titration.

Polymerization:

A 200-liter continuous polymerization reactor was charged continuously with dehydrated and purified hexane, diethyl aluminum chloride and the supported Ti catalyst component prepared as above at a rate of 80 liters/hr, 20 mmoles/hr, and 0.3 mmole/hr (calculated as titanium), respectively. Then, ethylene, propylene, 4-methyl-1-pentene and hydrogen were simultaneously fed continuously into the polymerization reactor at a rate of 13 kg/hr, 2.5 kg/hr, and 9.0 kg/hr, and 100 liters/hr, respectively. The monomers were polymerized at a polymerization temperature of 150° C. under a total pressure of 30 kg/cm².G with a residence time of 1 hour. The concentration of the resulting terpolymer was maintained at 110 g/liter of the solution during the polymerization.

The resulting copolymer had a density of 0.923 g/cm³ and a melt index (MI) of 2.13, and contained 95.5 mole% of ethylene, 2.4 mole% of propylene, and 2.1 mole% of 4-methyl-1-pentene.

The terpolymer was molded by a commercially available tubular film-forming machine (a product of Modern Machinery Company) designed for high-pressure polyethylene to form a film having a width of 350 mm and a thickness of 40 microns. The film-forming conditions were as follows:

Resin temperature: 130° C.
Rotating speed of the screw: 100 rph
Diameter of the die: 100 mm
Die slit width: 0.8 mm The properties of the resulting film are shown in Table 1. The film had good transparency and strength.

EXAMPLE 2

A 200-liter continuous polymerization reactor was charged continuously with dehydrated and purified hexane, diethyl aluminum chloride, and the Ti catalyst component obtained in Example 1 at a rate of 80 liters/hr, 20 mmoles/hr, and 0.3 mmole/hr (calculated as titanium), respectively. Then, ethylene, propylene, 4-methyl-1-pentene, and hydrogen were simultaneously fed continuously into the polymerization reactor at a rate of 13 kg/hr, 1 kg/hr, 12.0 kg/hr, and 90 liters/hr, respectively. The monomers were polymerized at a polymerization temperature of 150° C. under a total presure of 30 kg/cm².G with a residence time of 1 hour. The concentration of the terpolymer was maintained at 102 g/liter of the solution during the polymerization.

The resulting terpolymer had a density of 0.920 g/cm³, and an MI of 1.94, and contained 95.9 mole% of ethylene, 0.9 mole% of propylene, and 3.2 mole% of 4-methyl-1-pentene.

The terpolymer was formed into a film under the same conditions as in Example 1. The results are shown in Table 1.

EXAMPLE 3

A 200-liter continuous polymerization reactor was charged continuously with dehydrated and purified hexane, diethyl aluminum chloride, eiethyl aluminum sesquichloride, and the Ti catalyst component described in Example 1 at a rate of 80 liters/hr, 12 mmoles/hr, 12 mmoles/hr, and 0.8 mmole/hr (calculated as titanium), respectively. Then, ethylene, 1-butene, 4-methyl-1-pentene, and hydrogen were simultaneously fed continuously into the polymerization reactor at a rate of 13.5 kg/hr, 4 kg/hr, 10 kg/hr, and 90 liters/hr, respectively. The monomers were polymerized at a polymerization temperature of 150° C. under a total pressure of 30 kg/cm².G with a residence time of 1 hour. The concentration of the resulting copolymer was maintained at 108 g/liter of the solution during the polymerization.

The resulting terpolymer had a density of 0.921 g/cm³ and an MI of 1.75, and contained 95.1 mole% of ethylene, 2.6 mole% of 1-butene, and 2.3 mole% of 4-methyl-1-pentene.

The terpolymer was formed into a film under the same conditions as in Example 1. The results are shown in Table 1.

EXAMPLE 4

Preparation of Ti catalyst component:

Under a nitrogen stream, 5 moles of anhydrous magnesium chloride (commercially available) was suspended in 10 liters of dehydrated and purified hexane, and with stirring, 30 moles of ethanol was added dropwise over 1 hour. Then, 14.2 mole of diethyl aluminum chloride was added dropwise at room temperature, and the mixture was stirred for 1 hour. Further, 2 moles of titanium tetrachloride and 2 moles of triethylaluminium were added. The mixture was subjected to a reducing reaction while being stirred at room temperature for 4 hours. The color of the solid portion changed to light brown peculiar to trivalent titanium. The titanium concentration in the resulting hexane suspension was determined by titration.

Polymerization:

The same continuous polymerization reactor as used in Example 1 was continuously charged with dehydrated and purified hexane, diethyl aluminum chloride, and the supported titanium catalyst component obtained as described above at a rate of 80 liters/hr, 24 mmoles/hr, and 0.4 mmole/hr calculated as titanium), respectively. Then, ethylene, 1-butene, 4-methyl-1-pentene and hydrogen were simultaneously fed continuously into the polymerization reactor at a rate of 13.0 kg/hr, 1.5 kg/hr, 12.0 kg/hr, and 90 liters/hr, respectively. The monomers were polymerized at a polymerization temperature of 145° C. under a total pressure of 30 kg/cm$^2$.G with a residence time of 1 hour. The concentration of the terpolymer was maintained at 115 g/liter of the solution during the polymerization.

The resulting terpolymer had a density of 0.925 g/cm$^3$ and an MI of 2.80, and contained 96.7 mole% of ethylene, 0.6 mole% of 1-butene and 2.7 mole% of 4-methyl-1-pentene. The terpolymer had good transparency.

By the same method as in Example 1, a film having a high tear strength was obtained. The results are shown in Table 1.

EXAMPLE 5

The same continuous polymerization reactor was charged continuously with dehydrated and purified hexane, ethyl aluminum sesquichloride, and the supported Ti catalyst component described in Example 4 at a rate of 80 liters/hr, 24 mmoles/hr, and 1.5 mmoles/hr (calculated as titanium), respectively. Then, ethylene, propylene, 4-methyl-1-pentene, and hydrogen were simultaneously fed continuously into the polymerization reactor at a rate of 13 kg/hr, 2 kg/hr, 10 kg/hr, and 100 liters/hr, respectively. The monomers were polymerized at a polymerization temperature of 150° C. under a total pressure of 30 kg/cm$^2$.G with a residence time of 1 hour. The concentration of the terpolymer was maintained at 118 g/liter of the solution during the polymerization.

The resulting terpolymer had a density of 0.922 g/cm$^3$ and an MI of 2.35, and contained 96.0 mole% of ethylene, 1.6 moles of propylene and 2.4 mole% of 4-methyl-1-pentene.

The copolymer was formed into a film under the same conditions as in Example 1. The results are shown in Table 1.

EXAMPLE 6

A 200-liter continuous polymerization reactor was charged continuously with dehydrated and purified hexane, diethyl aluminum chloride, and the Ti catalyst component described in Example 1 at a rate of 80 liters/hr, 20 mmoles/hr, and 0.3 mmole/hr (calculated as titanium), respectively. Then, ethylene, propylene, 1-octene and hydrogen were simultaneously fed continuously into the polymerization reactor at a rate of 13 kg/hr, 2 kg/hr, 12 kg/hr, and 100 liters/hr, respectively. The monomers were polymerized at a polymerization temperature of 150° C. under a total pressure of 30 kg/cm$^2$.G with a residence time of 1 hour. The concentration of the terpolymer was maintained at 99 g/liter of the solution during the polymerization.

The resulting terpolymer had a density of 0.923 g/cm$^3$ and an Ni of 2.45, and contained 97.2 mole% of ethylene, 1.2 mole% of propylene, and 1.6 mole% of 1-octene.

The copolymer was formed into a film under the same conditions as in Example 1. The results are shown in Table 1.

COMPARATIVE EXAMPLE 1

A 200-liter continuous polymerization reactor was charged continuously with dehydrated and purified hexane, diethyl aluminum chloride, and the Ti catalyst component described in Example 1 at a rate of 80 liters/hr, 20 mmoles/hr, and 0.3 mmole/hr (calculated as titanium), respectively. Then, ethylene, propylene and hydrogen were simultaneously fed continuously into the polymerization reactor at a rate of 13 kg/hr, 5.0 kg/hr, and 80 liters/hr, respectively. The monomers were polymerized at a polymerization temperature of 150° C. under a total pressure of 30 kg/cm$^2$.G with a residence time of 1 hour. The concentration of the copolymer was maintained at 118 g/liter of the solution during the polymerization.

The resulting copolymer had a density of 0.924 g/cm$^3$ and an MI of 2.50, and contained 94.5 mole% of ethylene and 5.5 mole% of propylene.

The copolymer was formed into a film under the same conditions as in Example 1. The results are shown in Table 1.

COMPARATIVE EXAMPLE 2

A 200-liter continuous polymerization reactor was continuously charged with dehydrated and purified hexane, diethyl aluminum chloride, and the Ti catalyst component described in Example 1 at a rate of 80 liters/hr, 20 mmoles/hr, and 0.3 mmole/hr (calculated as titanium), respectively. Then, ethylene, 1-butene and hydrogen were simultaneously fed continuously into the polymerization reactor at a rate of 13 kg/hr, 9.0 kg/hr, and 90 liters/hr, respectively. The monomers were polymerized at a polymerization temperature of 150° C. under a total pressure of 30 kg/cm$^2$.G with a residence time of 1 hour. The concentration of the copolymer was maintained at 110 g/liter of the solution during the polymerization.

The resulting copolymer had a density of 0.929 g/cm$^3$ and an MI of 2.15, and contained 95.4 mole% of ethylene and 4.6 mole% of 1-butene.

The copolymer was formed into a film under the same conditions as in Example 1. The results are shown in Table 1.

COMPARATIVE EXAMPLE 3

A 200-liter continuous polymerization reactor was charged with dehydrated and purified hexane, diethyl aluminum chloride, and the Ti catalyst component described in Example 1 at a rate of 80 liters/hr, 20 mmoles/hr, and 0.4 mmole/hr (calculated as titanium), respectively. Then ethylene, 4-methyl-1-pentene, and hydrogen were simultaneously fed continuously into the polymerization reactor at a rate of 13 kg/hr, 13 kg/hr, and 110 liters/hr, respectively. The monomers were polymerized at a polymerization temperature of 150° C. under a total pressure of 30 kg/cm$^2$.G with a residence time of 1 hour. The concentration of the copolymer was maintained at 107 g/liter of the solution during the polymerization.

The resulting copolymer had a density of 0.922 g/cm$^3$ and an MI of 3.04, and contained 96.7 mole% of ethylene, and 3.3 mole% of 4-methyl-1-pentene.

The copolymer was formed into a film under the same conditions as in Example 1. The results are shown in Table 1.

COMPARATIVE EXAMPLE 4

A 200-liter continuous polymerization reactor was charged continuously with dehydrated and purified hexane, diethyl aluminum chloride, and the Ti catalyst component described in Example 1 at a rate of 80 liters/hr, 20 mmoles/hr, and 0.4 mmole/hr (calculated as titanium), respectively. Then, ethylene, 1-octene, and hydrogen were simultaneously fed continuously into the polymerization reactor at a rate of 13 kg/hr, 14 kg/hr, and 100 kg/hr, respectively. The monomers were polymerized at a polymerization temperature of 150° C. under a total pressure of 30 kg/cm$^2$.G with a residence time of 1 hour. The concentration of the copolymer was maintained at 111 g/liter of the solution during the polymerization.

The resulting copolymer had a density of 0.926 g/cm$^3$ and an MI of 2.90, and contained 97.5 mole% of ethylene and 2.5 mole% of 1-octene.

The copolymer was formed into a film under the same conditions as in Example 1. The results are shown in Table 1.

What is claimed is:

1. A process for producing a random terpolymer of ethylene and alpha-olefins having at least 3 carbon atoms in the presence of a catalyst composed of (1) a titanium catalyst component having a surface area of at least 20 m$^2$/g and comprising from 0.5 to 10 parts by weight of titanium, 15 to 30 parts by weight of magnesium, 50 to 70 parts by weight of halogen and, optionally, about 0.1 to 50 parts by weight of an electron donor; said titanium catalyst component having a halogen/titanium weight ratio of from 3 to 200, and a magnesium/titanium mole ratio of from 3 to 90 and a surface area of at least 20 m$^2$/g and (2) an organoaluminum catalyst component in a hydrocarbon solvent at a temperature above the melting point of the terpolymer formed, under such conditions that the resulting copolymer dissolves in the hydrocarbon solvent; characterized in that said terpolymer consists essentially of (A) 92 mole% to 99 mole% of ethylene,
(B) 0.3 mole% to 7 mole% of an alpha-olefin with 3 or 4 carbon atoms, and
(C) 0.3 mole% to 7 mole% of an alpha-olefin with 6 to 12 carbon atoms, the total of the proportions of the monomers (A), (B), and (C) being 100 mole%.

2. The process of claim 1 wherein said titanium catalyst component is a solid reaction product of (a) the reaction product between (i) an adduct of magnesium chloride with (ii) a lower alcohol and (iii) an organoaluminum compound, with (b) titanium tetrachloride or (b') titanium tetrachloride and an organoaluminum compound.

3. The process of any one of claims 1 or 2 wherein said organoaluminum catalyst component (2) is an organoaluminum compound of the general formula

wherein R$^1$ and R$^2$ are identical or different, and represent a hydrocarbon radical having 1 to 15 carbon atoms, X is halogen, m is a number defined by 0<m>3, n is a number defined by 0≦n<3, p is a number defined by

TABLE 1

| Example (Ex.) and Comparative Example (CEx.) | | | Ex. 1 | Ex. 2 | Ex. 3 | Ex. 4 | Ex. 5 |
|---|---|---|---|---|---|---|---|
| Comonomers (content, mole %) | | B | Propylene (2.4) | Propylene (0.9) | 1-Butene (2.6) | 1-Butene (0.6) | Propylene (1.6) |
| | | C | 4-Methyl-1-pentene (2.1) | 4-Methyl-1-pentene (3.2) | 4-Methyl-1-pentene (2.3) | 4-Methyl-1-pentene (2.7) | 4-Methyl-1-pentene (2.4) |
| Melt index | | | 2.13 | 1.94 | 1.75 | 2.80 | 2.35 |
| Density (g/cm$^3$) | | | 0.923 | 0.920 | 0.921 | 0.925 | 0.922 |
| Properties of 40 μ-thick injection film | Haze (%) | | 2.0 | 2.5 | 1.5 | 2.5 | 0.9 |
| | Impact strength (kg · cm/cm) | | 1700 | 2200 | 1300 | 2400 | 2000 |
| | Elemendorf tear strength (kg/cm) | HD | 77 | 128 | 88 | 120 | 79 |
| | | TD | 153 | 190 | 162 | 194 | 143 |
| Example (Ex.) and Comparative Example (CEx.) | | | Ex. 6 | CEx. 1 | CEx. 2 | CEx. 3 | CEx. 4 |
| Comonomers (content, mole %) | | B | Propylene (1.2) | Propylene (5.5) | 1-Butene (4.6) | — | — |
| | | C | 1-Octene (1.6) | — | — | 4-Methyl-1-pentene (3.3) | 1-Octene (2.5) |
| Melt index | | | 2.45 | 2.50 | 2.15 | 3.04 | 2.90 |
| Density (g/cm$^3$) | | | 0.923 | 0.924 | 0.929 | 0.922 | 0.926 |
| Properties of 40 μ-thick injection film | Haze (%) | | 3.0 | 2.5 | 3.0 | 5.0 | 6.0 |
| | Impact strength (Kg · cm/cm) | | 2100 | 1200 | 1400 | 2500 | 2600 |
| | Elemendorf tear strength (kg/cm) | HD | 81 | 29 | 33 | 150 | 130 |
| | | TD | 159 | 83 | 101 | 195 | 175 |

$0 \leq p < 3$, and q is a number defined by $0 \leq q < 3$ provided that $m+n+p+q=3$.

4. The process of claim 2 wherein the organoaluminum compound (a)(iii) used in preparing the reaction product (a) and optionally the organoaluminum compound in (b') is at least one organoaluminum compound selected from the group consisting of compounds of formula $M^1AlR_4^1$ wherein $R^1$ is a hydrocarbon group having 1 to 15 carbon atoms, $M^1$ is lithium, sodium or potassium, compounds of formula $R^1{}_{3-m}AlX_m$ wherein $R^1$ is the same as defined above, X is a halogen atom, and m is zero or a positive number of not greater than 3, compounds of formula $R^1{}_{3-n}Al(OR^2)n$ wherein $R^1$ is as defined above, $R^2$ is a hydrocarbon group, which is identical to, or different from, $R^1$, and n is a positive number greater than 0 but not greater than 3, and compounds of formula $R^1Al(OR^2)X$ wherein $R^1$, $R^2$ and X are the same as defined above.

5. The process of claim 1 wherein the amount of the titanium catalyst component (1) is 0.006 to 1 millimole, calculated as Ti atom, per liter of the hydrocarbon solvent, and the amount of the organoaluminum catalyst component (2) is 0.01 to 10 millimoles, calculated as Al atom, per liter of the hydrocarbon solvent.

6. The process of claim 5 wherein the Al/Ti mole ratio is from 1 to 1,000.

7. The process of claim 1 wherein the alpha-olefin with 6 to 12 carbon atoms is selected from the group consisting of 1-hexene, 4-methyl-1-pentene, 3-methyl-1-pentene, 1-heptene, 1-octene and 1-decene.

8. The process of claim 1 wherein the alpha-olefin with 3 or 4 carbon atoms is propylene.

9. The process of claim 1 wherein the alpha-olefin with 3 or 4 carbon atoms is butene-1.

10. The process of claims 8 or 9 wherein the alpha-olefin with 6 to 12 carbon atoms is 4-methyl-1-pentene.

* * * * *

UNITED STATES PATENT AND TRADEMARK OFFICE
CERTIFICATE OF CORRECTION

PATENT NO. : 4,438,243
DATED : March 20, 1984
INVENTOR(S) : NORIO KASHIWA, ET AL.

It is certified that error appears in the above—identified patent and that said Letters Patent is hereby corrected as shown below:

Claim 3, Column 12, line 37, change "$0<m<3,$" to ---$0<m\leq 3,$---

Signed and Sealed this

Fourth Day of September 1984

[SEAL]

Attest:

GERALD J. MOSSINGHOFF

Attesting Officer    Commissioner of Patents and Trademarks